United States Patent Office 3,732,263
Patented May 8, 1973

3,732,263
METHOD FOR POLYMERIZING FATTY ACIDS
Lawrence U. Berman, Skokie, Ill., assignor to Kraftco Corporation, New York, N.Y.
No Drawing. Filed Sept. 16, 1970, Ser. No. 72,845
Int. Cl. C09f 7/06; C11c 3/00
U.S. Cl. 260—407
4 Claims

ABSTRACT OF THE DISCLOSURE

A method for polymerization of unsaturated fatty acids is provided. In the method, polymerization of unsaturated fatty acids is effected by heating unsaturated fatty acids in the presence of a particular neutral clay catalyst. The usual temperature range embraced is from about 225° C. to about 270° C. for a period of about one hour to about five hours at a pressure of from about 90 p.s.i.g. to about 160 p.s.i.g. Moisture is usually present in the reaction mixture in an amount of from about 2 to about 5 percent by weight of the reaction mixture.

---

The present invention relates to polymerization of unsaturated fatty acids to provide a product having a high level of dimerized fatty acids. In particular, the invention relates to the use of a particular neutral clay as a catalyst to provide a high yield of polymerized fatty acids.

Polymerized fatty acids, particularly dimerized fatty acids, are used for the preparation of polyamide resins and other resin products. It is known to employ various clay catalysts for the purpose of polymerizing fatty acids to provide polymerized fatty acids having a content of dimerized fatty acids. Both acid and alkaline clay catalysts have been used in the art. However, the known alkaline and acid catalysts which have been taught by the prior art have not been completely satisfactory.

For example, in the polymerization of fatty acids, it is desirable to use as low a level of clay catalyst as possible so that a subsequent filtration step used to separate the polymerized fatty acids from the catalyst may be practiced as effectively and economically as possible. It is also desirable to provide polymerized fatty acids having a high ratio of dimerized fatty acids to trimerized fatty acids and at as high a yield as possible. It is also desirable to provide a product with a high acid value. It is further desirable not to effect saponification of the fatty acids during the reaction by forming soaps. The presence of soaps is detrimental to the product.

The prior art has not succeeded in supplying a clay catalyst for use in the polymerization of fatty acids which fully meets all of the desired requirements indicated above. For example, in U.S. Pat. No. 3,157,681 to Fischer, a particular clay catalyst is described which effects polymerization of fatty acid mixtures in high yields. However, a high level of catalyst is required, and the particular catalyst taught by the Fischer patent is not completely satisfactory in that such high catalyst levels must be used.

The use of alkaline catalysts and alkaline materials during the polymerization reaction is taught in U.S. Pat. No. 2,955,121 to Myers et al. However, saponification occurs in the use of alkaline materials and this is not usually desirable. The use of acid clay catalysts are taught in U.S. Pat. No. 2,793,220 to Barrett et al. However, use of the acid clay catalysts of the Barrett et al. patent have not generally provided a high polymerization yield. As indicated, it is desirable to provide a catalyst which is capable of providing higher yields.

It is therefore a principal object of the present invention to provide a particular neutral clay catalyst for use in preparing a product having a high content of dimerized fatty acids. It is also an object of the present invention to provide an improved process for the polymerization of unsaturated fatty acids. It is a further object of the present invention to provide a particular neutral clay catalyst for use in the manufacture of polymerized fatty acids. A more particular object is the provision of a process which provides a high yield of dimerized fatty acids and a high ratio of dimerized fatty acids to trimerized fatty acids. A still further particular object is the provision of a process which provides high yield of dimerized fatty acids with minimum saponification.

Generally, in a process including various features of the invention, polymerization of unsaturated fatty acids is effected by heating an individual unsaturated fatty acid, or mixture of unsaturated fatty acids, in the presence of a particular neutral clay catalyst, hereinafter described in detail. The usual temperature range employed is from about 225° C. to about 275° C. for a period of from about one hour at about five hours. The polymerization reaction is usually carried out under pressure of from about 90 p.s.i.g. to about 160 p.s.i.g., and moisture is usually present in the reaction mixture in an amount of from about 2 to about 5 percent by weight of the reaction mixture.

After the polymerization reaction, the product is cooled and filtered to remove the clay catalyst. Unreacted monomeric material is then removed by distillation or other means, leaving a polymeric fatty acid product having a high content of dimerized fatty acids, referred to as dimers, unreacted fatty acids, called monomers, and more highly polymerized fatty acids known as trimers. The polymeric fatty acid product may be further treated by bleaching and hydrogenation processes in accordance with known methods, if desired.

As previously indicated, it is generally known from the literature that various clays may be used as catalysts in the polymerization of fatty acids. It is also known that similar clays varying little in composition, vary greatly in the type and extent of activity that are associated with the clay during the polymerization reaction. Accordingly, it has not been possible to predict the ability of a clay to catalyze fatty acid polymerization reactions. The exact characteristics of any particular clay which account for its behavior as a polymerization catalyst is not understood, and the effectiveness of a clay for the purpose of effecting polymerization of fatty acids is wholly unpredictable.

Accordingly, it is totally unexpected that the use of a particular neutral clay catalyst as taught by the present invention is sufficient to overcome many of the problems associated with the preparation of polymerized fatty acids. This discovery is entirely unexpected, surprising and fortuitous because of the lack of predictability of the catalytic activity of particular clays.

Higher unsaturated fatty acids having from 8 to 22 carbon atoms may be employed in the process of the present invention. The process is particularly adapted to the polymerization of fatty acids derived from common raw materials ordinarily used as a source to provide unsaturated fatty acids. In this connection, soy fatty acids derived from soy bean oil, linseed oil, cottonseed oil, safflower oil and fish oils, tallow fatty acids and tall oil fatty acids may be used. Saturated fatty acids usually occur in nature with unsaturated fatty acids. The saturated acids do not polymerize in the process of the invention; however, separation of the saturated from the unsaturated fatty acids before polymerization is not necessary, and the polymerization may be carried out in the presence of saturated fatty acids which remain unreacted during the process. After polymerization, the unreacted material, including saturated fatty acids and any unreacted, unsaturated fatty acids may, if desired, be removed by distillation or other means.

The clay catalyst used in the method of the invention is a neutral, bentonite, crystalline clay material having a neutral pH of between about 6.5 and 7.5. The clay is mined by American Colloid Company from its mines near Leetchatchee, Ala., and is sold under the trade name Panther Creek Neutral Clay. This clay has been mined and sold for many years for the purpose of bonding said in metal casting and for filtering and decolorizing oils. However, the ability of this clay to function as a superior catalyst in a process for making polymerized fatty acids has not been recognized. For ease in reference, the neutral clay of the invention will be sometimes referred to hereinafter in the specification and claims as "Alabama neutral clay."

As previously indicated, it is difficult, if not impossible, to ascertain the catalytic effectiveness of clays on the basis of chemical analysis. However, the particular clay used in the process of the present invention is fully disclosed for the purposes of those skilled in the clay art by reference to its trade name and generic type.

A sample of the neutral clay when analyzed on a dry basis provided the following results:

| Ingredient: | Wt. percent |
|---|---|
| $SiO_2$ | 56.8 to 58.8. |
| $Al_2O_3$ | 18.5 to 20.3. |
| $Fe_2O_3$ | 5.0 to 5.9. |
| $FeO$ | 0.5 to 0.7. |
| $MgO$ | 3.1 to 3.3. |
| $CaO$ | 1.4 to 3.3. |
| $Na_2O$ | 0.3 to 0.5. |
| $K_2O$ | 0.6 to 0.7. |
| $TiO_2$ | 0.8 to 0.9. |
| $SO_3$ | 0.1 or less. |
| $CO_2$ | 0.4 to 1.2. |

The neutral clay of the invention as provided by the American Colloid Company is in the form of a fine powder of which 100 percent passes 150 mesh screen and 90 percent passes a 200 percent mesh screen.

The full benefits of the use of Alabama neutral clay are obtained when the amount of clay employed in the polymerization reaction is from about one percent to about four percent by weight of the unsaturated fatty acids to be polymerized. Higher levels of clay may also be used, but no improved results are obtained. As previously indicated, the use of higher levels of clay catalyst are desirably avoided to enhance the economics of the process, particularly by increasing efficiency in the filtration step. One of the principal advantages of the present invention is the low level of clay that may be used and still obtain high yields of a polymerized product with a high dimer to trimer ratio. At levels of use of the clay catalyst below about two percent, there is some decline in conversion yield. It is, therefore, preferred to use levels of clay catalyst above about two percent.

When used to effect polymerization of tall oil fatty acids, Alabama neutral clay provides yields of polymerized product of from about 55 percent up to about 65 percent by weight of the starting fatty acid weight. The polymerized product generally has a dimer content of at least about 70 percent, and may provide a dimer content in excess of 80 percent. A distilled polymerized product is obtained with from about 80 to about 97 percent total polymerized fatty acids and with a dimer to trimer weight ratio of from about 4:1 to about 8:1. The polymerized product has an acid value of from about 180 to about 190 and a saponification value of from about 192 to about 198.

The following examples illustrate various features of the invention, but are intended to in no way limit the scope of the invention which is defined in the appended claims.

EXAMPLE I

Fatty acids (100 parts) which were obtained from the distillation of tall oil, were charged into a small laboratory pressure vessel. The fatty acids comprised 95 percent unsaturated acids. Various clay catalysts (4 parts), including the neutral clay catalyst of the present invention, were then dispersed in the fatty acids. Water (2 parts was then added to the mixture and the pressure vessel was sealed. The mixture in the pressure vessel was then agitated and heated to and maintained at a temperature of 240° C. to 250° C. for a period of four hours. At the end of this period, the mixture was cooled to 120° C. and the water was removed in the form of steam with the aid of a slow current of nitrogen. The reaction mixture was cooled to 95° C. and was then filtered to remove the clay catalyst. The polymerized fatty acids were separated from the saturated fatty acid and unreacted unsaturated fatty acids by simple overhead distillation from a glass flask. The monomer, dimer and trimer content of the polymerized fatty acid product was determined by thin layer chromatographic analysis. The results with respect to the various clay catalysts used are reported below in Table I.

TABLE 1

| | Type clay catalyst | | | | | | | |
|---|---|---|---|---|---|---|---|---|
| | Bennett Clark "Natural" | Filtrol 13 | Filtrol 20 | Super Filtrol | Neutral 40 | Palex II | Impact 150 | Alabama Neutral Clay |
| pH of 10 W/O clay slurry with distilled water | 8.3 | 3.2 | 3.1 | 3.5 | 3.2 | 7.1 | 2.7 | 6.8 |
| | Reaction results | | | | | | | |
| Acid value (A.V.) | 187.1 | 191.6 | 175.8 | 181.0 | 177.1 | 190.6 | 176.0 | 187.4 |
| Weight percent of residue after stripping: | | | | | | | | |
| Monomer | 5-10 | 10 | 10 | 10-15 | 10-15 | 10-15 | 15-20 | 5 |
| Dimer | 70-75 | 65-70 | 65-70 | 70 | 65-70 | 70 | 70 | 80 |
| Trimer | 15-20 | 15-20 | 15-20 | 15-20 | 15-20 | 15 | 15 | 10-15 |
| Dimer to trimer ratio | 3.5-4.7 | 3.2-4.7 | 3.2-4.7 | 3.5-4.7 | 3.2-4.7 | 4.7 | 4.7 | 5.3-8.0 |
| Yield | 49.0 | 54.2 | 60.7 | 60.0 | 60.4 | 42.7 | 59.3 | 57.7 |

From the above table it can be seen that the Alabama neutral clay of the invention provides polymerized fatty acids with improved results when compared to polymerized fatty acids prepared with known clay catalysts. A higher dimer to trimer ratio is achieved, while the yield and acid value are comparable to that obtained with the known clay polymerization catalysts.

What is claimed is:

1. A process for polymerization of unsaturated fatty acids comprising heating unsaturated fatty acids in the presence of an Alabama neutral, bentonite, crystalline clay catalyst having a pH of between about 6.5 and about 7.5.

2. A process in accordance with claim 1 wherein said Alabama neutral clay catalyst is present at a level of from about 1 percent to about 4 percent by weight of said fatty acids.

3. A process in accordance with claim 1 wherein said heating is at a temperature of from about 225° C. to about 275° C. for a period of from about one hour to about five hours.

4. A process in accordance with claim 1 wherein water is present during said heating at a level of from about 2 percent to about 5 percent by weight of the reaction mixture.

References Cited
UNITED STATES PATENTS 2,955,121  10/1960  Myers et al. _____ 260—407
3,507,890  4/1970  Dieckelmann et al. ___ 260—407

LEWIS GOTTS, Primary Examiner

D. G. RIVERS, Assistant Examiner

U.S. Cl. X.R.

260—97.5